(No Model.) 2 Sheets—Sheet 1.

A. ROBINSON.
FRICTIONAL GEARING.

No. 406,477. Patented July 9, 1889.

Witnesses:
Ezra H. White
Fred L. Leavitt

Inventor:
Almore Robinson (No Model.) 2 Sheets—Sheet 2.
A. ROBINSON.
FRICTIONAL GEARING.
No. 406,477. Patented July 9, 1889.
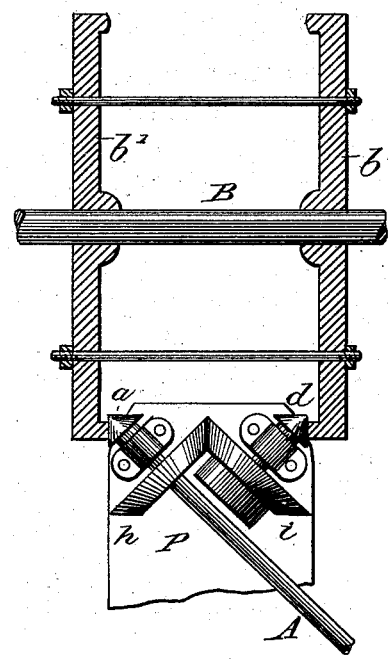
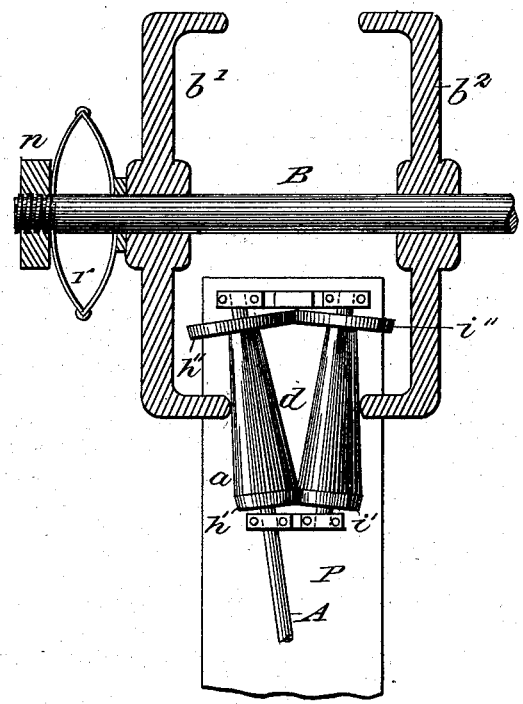
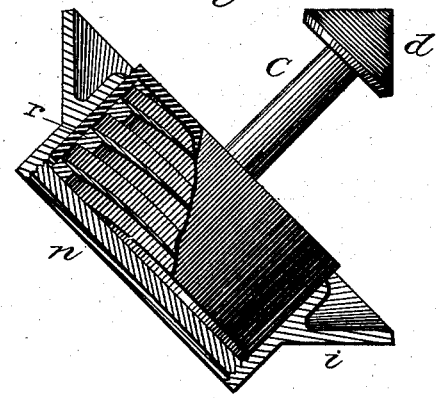
Witnesses:
Ezra H. White
Fred L. Leavitt
Inventor:
Almon Robinson

UNITED STATES PATENT OFFICE.

ALMON ROBINSON, OF LEWISTON, MAINE.

FRICTIONAL GEARING.

SPECIFICATION forming part of Letters Patent No. 406,477, dated July 9, 1889.

Application filed May 23, 1887. Serial No. 239,159. (No model.)

*To all whom it may concern:*

Be it known that I, ALMON ROBINSON, a citizen of the United States, residing at Lewiston, in the county of Androscoggin and State of Maine, have invented certain new and useful Improvements in Frictional Gearing, of which the following is a specification.

My invention relates to mechanism for the transmission of motion from one shaft to another, having a variable relative rate of rotation, by means of frictional gearing attached to the shafts; and it consists in a train of mechanism in which transmission by direct contact of frictional gears attached to the above-mentioned shafts is combined with transmission through similar frictional gears attached to one or more intermediate shafts. I thereby reduce the waste from friction at the bearings.

The object of my invention is to provide a suitable connection for machines or parts of machines which require in either the driving or the driven part a varying speed—as, for example, in connecting sewing-machines with a driving-shaft having a constant speed, or in connecting an electric motor with hoisting-gear or with the driving-wheels of a self-moving vehicle.

Figure 1:
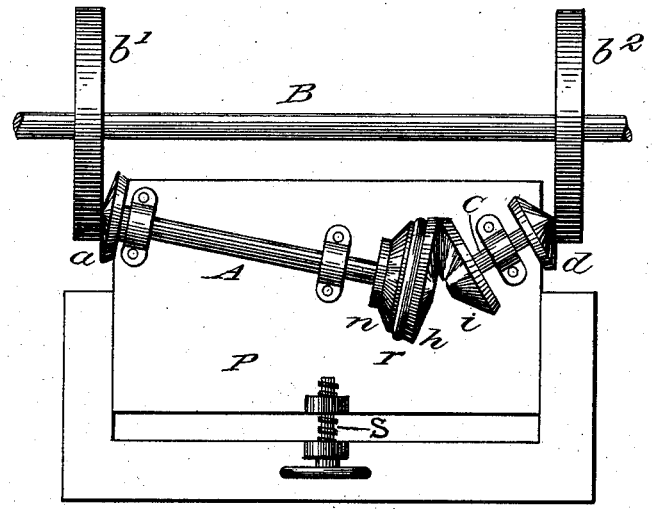
Figure 2:
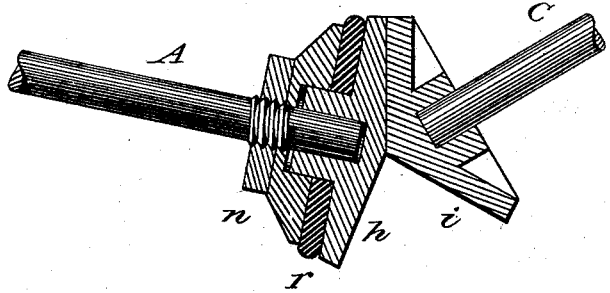
Figure 3:
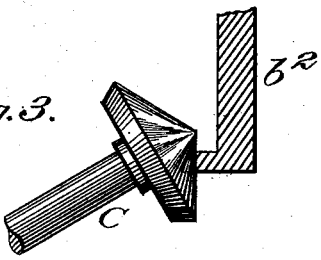

In the accompanying drawings, Figure 1 shows the application of my invention to the connection of two shafts which are at an acute angle to each other. Figs. 2 and 3 are enlarged sections showing details of Fig. 1. Fig. 4 shows its application to shafts at an angle of forty-five degrees. In Fig. 5 the connected shafts make a still greater angle. Fig. 6 is a detail of Fig. 4.

In all the figures, A and B are the principal shafts; C, an intermediate shaft. $a$ and $h$ are conical friction-gears upon the shaft A. $i$ and $d$ are conical friction-gears upon the shaft C. $b'$ $b^2$ are frictional contrate-wheels upon the shaft B. $r$ is a spring reacting to produce a pressure between the contrate-wheels $b'$ $b^2$; $n$, a nut or other movable piece for varying the tension of the spring $r$.

The shafts A C and their connections are shown in Figs. 1, 4, and 5 mounted upon a bed-piece P, which has liberty of motion in a direction at right angles to the shaft B.

In Fig. 1 a screw S is shown, which moves the piece P as desired. I may substitute for this screw any well-known appliance or combination for imparting rectilinear motion, which may be better suited to particular applications of my invention. It is also obvious that the piece P may be fixed and the shaft B, with its connections, made movable instead.

In Fig. 1 the shaft A makes a very acute angle with B; in Fig. 4 an angle of forty-five degrees; in Fig. 5 an angle between forty-five degrees and ninety degrees. The conical friction-gears $a$ upon the shaft A and $d$ upon the shaft C are so proportioned that the lines which contain their successive points of contact with the frictional contrate-wheels $b'$ $b^2$ are parallel to each other, and lie in the direction in which the bed-piece P is constrained to move. The line containing the points of contact of the gears $h$ and $i$ is parallel to the lines above mentioned, and has such a length and position that the straight line joining corresponding points of contact between the friction-gears $a$ $d$ and the frictional contrate-wheels $b'$ $b^2$ intersects it in all positions of the bed-piece P. This construction prevents any component of the pressure between the two contrate-wheels from acting across the bearings of the shafts A and C.

When the angle made by the shafts A and B much exceeds forty-five degrees, it becomes more convenient to divide each of the friction-gears $h$ and $i$ into two parts $h'$ $h''$ and $i'$ $i''$, as shown in Fig. 5.

The shafts A and C are so adjusted upon the bed-piece P that points equally distant from the vertices of the conical gears $a$ and $d$ are in contact with the contrate-wheels $b'$ $b^2$. The construction shown then insures that in all positions of the bed-piece P the points of contact between $a$ $d$ and $b'$ $b^2$ shall have equal linear motion.

I have shown different methods of adjusting the pressure reacting between the contrate-wheels $b'$ $b^2$. In Fig. 2 (an enlarged detail of Fig. 1) the frictional gear $h$ revolves with the shaft A, but is free to slide upon it. It is pressed outward by the spring $r$, of any suitable material. The compression of this spring is varied by the nut $n$, working in a thread upon the shaft A. In Fig. 6 (a detail of Fig. 4) the gear $i$ is drawn outward by the adjusting-nut $n$, working in an internal screw, and compressing the spring $r$, contained in the hollow end of the shaft C. In Fig. 5 the spring $r$ reacts between the contrate-wheel $b'$, which is free to slide upon the shaft B, and the nut or other movable piece $n$ upon the shaft B.

The use of a particular form of spring or mode of attachment therefor is not an essential feature of my device. In some applications the elasticity of the transmission-wheels is sufficient.

In using my invention I create, in the manner hereinbefore set forth, a pressure between the contact-surfaces of the friction-gears sufficient to produce a frictional adhesion, which exceeds the amount of power that the train of mechanism is intended to transmit. I then connect either the shaft A or B, as may be desired, to a source of power, and the other shaft to the piece of mechanism to be moved, and vary the distance between the shaft B and the bed-piece P to correspond with the desired ratio of the rate of motion of the shaft B to that of the shaft A.

Having now fully described my invention, I wish it understood that since my device is capable of use under widely-varying conditions, I do not limit myself to the employment of the precise structural elements shown in the drawings, but claim the right to use in particular applications such substitutes as would naturally occur to a person skilled in designing machinery.

What I claim is—

1. In a train of mechanism for transmitting rotary motion, two frictional contrate-wheels mounted upon the same shaft, two conical friction-gears tangential to the planes of the contrate-wheels and two conical friction-gears tangential to each other and to a plane parallel to the plane of the contrate-wheel, all combined with each other and with the shafts upon which they are mounted, substantially as set forth.

2. In a train of mechanism for transmitting rotary motion, the combination of two shafts mounted upon a movable bed-piece, conical friction-gears connecting these shafts and having their point of contact in a straight line parallel to the line of motion of the bed-piece, a third shaft at right angles to this line of motion, a pair of frictional contrate-wheels mounted upon this shaft, a conical friction-gear upon the first shaft in continual contact with one of the contrate-wheels, and a conical friction-gear upon the second shaft in continual contact with the other contrate-wheel, all as set forth.

3. The combination of a bed-piece, two shafts mounted thereon, a pair of conical friction-gears upon each shaft whose working-surfaces make equal and opposite angles with the shaft, a third shaft in the same plane, a pair of frictional contrate-wheels mounted thereon, and means for varying the distance between the third shaft and the bed-piece, all as set forth.

In witness whereof I hereunto set my hand this 16th day of March, 1887.

ALMON ROBINSON.

Witnesses:
ELLA M. ROBINSON,
FRED B. VINING.